US009339148B2

(12) United States Patent
Machovina et al.

(10) Patent No.: US 9,339,148 B2
(45) Date of Patent: May 17, 2016

(54) SUPPLY ASSEMBLY FOR A FOOD HOMOGENIZER

(71) Applicant: Healthy Foods, LLC, Cleveland, OH (US)

(72) Inventors: Brian Louis Machovina, Coral Gables, FL (US); Robert Johnson, Montville, OH (US); Robert Schmidt, Painesville, OH (US); Winston Breeden, III, Chagrin Falls, OH (US); Douglas Edward Whitner, Chagrin Falls, OH (US); Ryan Scott Crisp, Lewis Center, OH (US); Eileen McHale, Coral Gables, FL (US)

(73) Assignee: Healthy Foods, LLC, Cleveland, OH (US)

( * ) Notice: Subject to any disclaimer, the term of this patent is extended or adjusted under 35 U.S.C. 154(b) by 249 days.

(21) Appl. No.: 14/076,523

(22) Filed: Nov. 11, 2013

(65) Prior Publication Data
US 2014/0061342 A1    Mar. 6, 2014

Related U.S. Application Data

(60) Continuation-in-part of application No. 14/023,944, filed on Sep. 11, 2013, now Pat. No. 8,925,845, which is a division of application No. 13/108,112, filed on May 16, 2011, now Pat. No. 8,550,390.

(Continued)

(51) Int. Cl.
*A47J 43/07*    (2006.01)
*A47J 43/046*    (2006.01)
*A47J 43/08*    (2006.01)

(52) U.S. Cl.
CPC ............... *A47J 43/07* (2013.01); *A47J 43/046* (2013.01); *A47J 43/0722* (2013.01); *A47J 43/085* (2013.01)

(58) Field of Classification Search
CPC ..... A47J 43/07; A47J 43/0722; A47J 43/016; A47J 43/085
USPC ..................... 241/92, 282.1, 282.2
See application file for complete search history.

(56) References Cited

U.S. PATENT DOCUMENTS

| 1,727,410 A | 9/1929 | Poesse |
| 2,228,025 A | 1/1941 | Apfelbeck |

(Continued)

FOREIGN PATENT DOCUMENTS

| EP | 1475024 A1 | 11/2004 |
| KR | 100433172 | 5/2004 |

OTHER PUBLICATIONS

International Search Report dated Mar. 20, 2012.

(Continued)

*Primary Examiner* — Faye Francis
(74) *Attorney, Agent, or Firm* — Cooper Legal Group LLC

(57) ABSTRACT

A supply assembly for a food homogenizer includes a cartridge defining a hollow interior for a food product. The supply assembly includes a force application device that applies a force to the food product. As such, the food product is movable with respect to the cartridge towards a blade assembly of the food homogenizer. A plunger movably supported within the hollow interior of the cartridge can be provided. As such, the plunger and the food product are movable with respect to the cartridge towards the blade assembly of the food homogenizer.

20 Claims, 14 Drawing Sheets

Related U.S. Application Data

(60) Provisional application No. 61/725,137, filed on Nov. 12, 2012, provisional application No. 61/789,822, filed on Mar. 15, 2013, provisional application No. 61/378,662, filed on Aug. 31, 2010, provisional application No. 61/440,939, filed on Feb. 9, 2011.

(56) References Cited

U.S. PATENT DOCUMENTS

| | | | |
|---|---|---|---|
| 2,567,371 A | 9/1951 | Forkey et al. | |
| 2,649,317 A | 8/1953 | Leuze | |
| 2,840,130 A | 6/1958 | Schwarz | |
| 3,249,310 A | 5/1966 | Willems | |
| 3,514,079 A | 5/1970 | Little, Jr. | |
| 3,933,317 A | 1/1976 | Rovere | |
| 3,976,001 A | 8/1976 | Trovinger | |
| 4,081,145 A | 3/1978 | Moe et al. | |
| 4,095,751 A | 6/1978 | Artin | |
| 4,227,656 A | 10/1980 | Engebretsen | |
| 4,250,771 A * | 2/1981 | Berler | A47J 43/07 241/282.1 |
| 4,311,315 A | 1/1982 | Kronenberg | |
| 4,387,860 A | 6/1983 | Necas et al. | |
| 4,390,133 A | 6/1983 | Wanat | |
| 4,691,870 A * | 9/1987 | Fukunaga | A47J 43/046 241/282.2 |
| 4,700,903 A | 10/1987 | Henn | |
| 4,844,362 A | 7/1989 | Revnivtsev et al. | |
| 4,856,718 A | 8/1989 | Gaber et al. | |
| 4,884,755 A | 12/1989 | Hedrington | |
| 4,948,614 A | 8/1990 | Feldpausch | |
| 4,955,724 A | 9/1990 | Otto | |
| 5,038,649 A * | 8/1991 | Hoaglin | B26D 3/185 247/291 |
| 5,098,731 A | 3/1992 | Feldpausch | |
| 5,201,529 A | 4/1993 | Heinzen | |
| 5,233,916 A | 8/1993 | Butler et al. | |
| 5,246,175 A | 9/1993 | Feldpausch | |
| 5,297,475 A | 3/1994 | Borger et al. | |
| 5,495,795 A | 3/1996 | Harrison et al. | |
| 5,584,577 A | 12/1996 | Thies | |
| 5,613,430 A | 3/1997 | Lee | |
| 5,662,032 A * | 9/1997 | Baratta | A47J 43/0722 210/380.1 |
| 5,675,228 A | 10/1997 | O'Bryan | |
| 5,680,997 A | 10/1997 | Hedrington | |
| 5,806,413 A | 9/1998 | Trovinger | |
| 5,896,812 A | 4/1999 | Basora et al. | |
| 5,906,154 A | 5/1999 | Yoon et al. | |
| 6,029,568 A | 2/2000 | Pascotti et al. | |
| 6,050,180 A | 4/2000 | Moline | |
| 6,098,410 A | 8/2000 | Horigane | |
| 6,112,649 A | 9/2000 | Jeong | |
| 6,210,033 B1 | 4/2001 | Karkos, Jr. et al. | |
| 6,350,053 B1 | 2/2002 | Morin | |
| 6,394,377 B1 | 5/2002 | Kim et al. | |
| 6,554,466 B1 | 4/2003 | Lee | |
| 6,604,454 B1 | 8/2003 | Tateno | |
| 6,606,939 B1 | 8/2003 | Tateno | |
| 6,637,323 B2 | 10/2003 | Kim | |
| 6,722,268 B2 | 4/2004 | Catelli et al. | |
| 6,748,853 B1 | 6/2004 | Brady et al. | |
| 6,766,731 B1 | 7/2004 | Lavi et al. | |
| 6,814,323 B2 | 11/2004 | Starr et al. | |
| 6,854,382 B2 | 2/2005 | Jan | |
| 6,910,800 B2 | 6/2005 | Wu | |
| 6,935,767 B2 * | 8/2005 | Nikkhah | A47J 43/042 366/129 |
| 6,968,777 B2 | 11/2005 | Lin | |
| 7,028,607 B2 | 4/2006 | Zweben | |
| 7,036,758 B2 | 5/2006 | Hamada et al. | |
| 7,040,799 B2 * | 5/2006 | Pryor, Jr. | A47J 43/0716 366/199 |
| 7,063,009 B2 | 6/2006 | Lin | |
| 7,080,594 B2 | 7/2006 | Lin | |
| D539,315 S | 3/2007 | Zweben | |
| 7,201,338 B2 | 4/2007 | Nakato et al. | |
| 7,217,028 B2 | 5/2007 | Beesley | |
| 7,422,361 B2 | 9/2008 | Pryor, Jr. et al. | |
| 7,648,264 B2 * | 1/2010 | Breviere | A47J 43/0716 366/205 |
| 7,665,885 B2 | 2/2010 | Pryor, Jr. | |
| 7,690,592 B2 | 4/2010 | Ferraby | |
| 7,861,958 B2 | 1/2011 | Waznys et al. | |
| 7,900,860 B2 | 3/2011 | Waznys et al. | |
| D682,606 S | 5/2013 | Machovina et al. | |
| 2001/0008258 A1 | 7/2001 | Robordosa et al. | |
| 2002/0012288 A1 | 1/2002 | Masip | |
| 2003/0226923 A1 | 12/2003 | Starr et al. | |
| 2006/0029709 A1 | 2/2006 | Zweben | |
| 2006/0065133 A1 | 3/2006 | Moline | |
| 2006/0176765 A1 | 8/2006 | Pryor, Jr. et al. | |
| 2007/0107609 A1 | 5/2007 | Barker et al. | |
| 2007/0296153 A1 | 12/2007 | Kurth et al. | |
| 2008/0106043 A1 | 5/2008 | Escriva Estruch | |
| 2009/0064875 A1 | 3/2009 | Trovinger | |
| 2009/0272280 A1 | 11/2009 | Cheung et al. | |
| 2009/0309310 A1 | 12/2009 | Wilson | |
| 2010/0005977 A1 | 1/2010 | Menashes | |
| 2010/0058940 A1 | 3/2010 | Rivera | |
| 2010/0282886 A1 | 11/2010 | Pallmann | |
| 2010/0288139 A1 | 11/2010 | Li et al. | |
| 2011/0095115 A1 | 4/2011 | Waznys et al. | |
| 2012/0048977 A1 | 3/2012 | Machovina et al. | |

OTHER PUBLICATIONS

International Search Report dated Feb. 7, 2014.
Corresponding Japanese Application, Japanese Office action dated Jan. 14, 2015.

\* cited by examiner

SUPPLY ASSEMBLY FOR A FOOD HOMOGENIZER

CROSS REFERENCE TO RELATED APPLICATIONS

This application claims the benefit of U.S. Provisional Application Nos. 61/725,137, filed on Nov. 12, 2012, and 61/789,822, filed on Mar. 15, 2013, and is a continuation in part of U.S. patent application Ser. No. 14/023,944, filed on Sep. 11, 2013, now U.S. Pat. No. 8,925,845, which is a divisional of U.S. patent application Ser. No. 13/108,112, filed on May 16, 2011, now U.S. Pat. No. 8,550,390, which claims the benefit of U.S. Provisional Application Nos. 61/378,662, filed on Aug. 31, 2010 and 61/440,939, filed on Feb. 9, 2011, the entire disclosures of which are hereby incorporated herein by reference.

BACKGROUND OF THE INVENTION

1. Field of the Invention

The present invention relates generally to a food homogenizer that easily enables people, through an easy to operate machine, to make a dessert/treat from frozen fruits, nuts, chocolates, non-frozen foods, and/or other ingredients.

2. Discussion of the Prior Art

Ice cream, sherbet, and frozen similar frozen desserts/treats are well liked by many people, but the opportunity to easily make frozen desserts/treats at home from healthy ingredients can be a challenge. Also, there are many opportunities for people to enjoy ice cream, sherbet, and frozen similar frozen desserts/treats outside of the home from various retail providers. However, selecting/obtaining such a dessert/treat that has all healthy ingredients can be a challenge.

There is a need for people, through an easy to operate machine, to be able to make a healthy dessert/treat from frozen fruits, nuts, chocolates, non-frozen foods, and/or other ingredients. Specifically, there is a need for an easy to operate machine that is able to make a healthy dessert/treat from frozen fruits, etc. by homogenizing the ingredients into a soft texture with a similar consistency to ice cream and sherbet outside of the home and possibly in a retail environment.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a supply assembly for a food homogenizer that has a blade assembly. The supply assembly includes a cartridge defining a hollow interior for a frozen food product. The supply assembly includes a force application device configured to transmit a force to the food product separate from the cartridge. The food product is movable with respect to the cartridge towards the blade assembly of the food homogenizer.

In accordance with another aspect, the present invention provides a supply assembly for a food homogenizer that has a blade assembly. The supply assembly includes a cartridge defining a hollow interior for a frozen food product. The supply assembly includes a plunger movably supported within the hollow interior of the cartridge. The food product is located on a first side of the plunger. The supply assembly includes a force application device configured to apply a force on a second side of the plunger. The plunger and the food product are movable with respect to the cartridge towards the blade assembly of the food homogenizer.

In accordance with another aspect, the present invention provides a supply assembly for a food homogenizer that has a blade assembly. The supply assembly includes a cartridge defining a hollow interior for a frozen food product. The cartridge extends between a first end and an opposing second end. The supply assembly includes a plunger movably supported at the second end within the interior of the cartridge. The food product is located on a first side of the plunger such that movement of the plunger towards the first end of the cartridge is configured to dispense the food product from the interior of the cartridge out of the first end toward the blade assembly.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
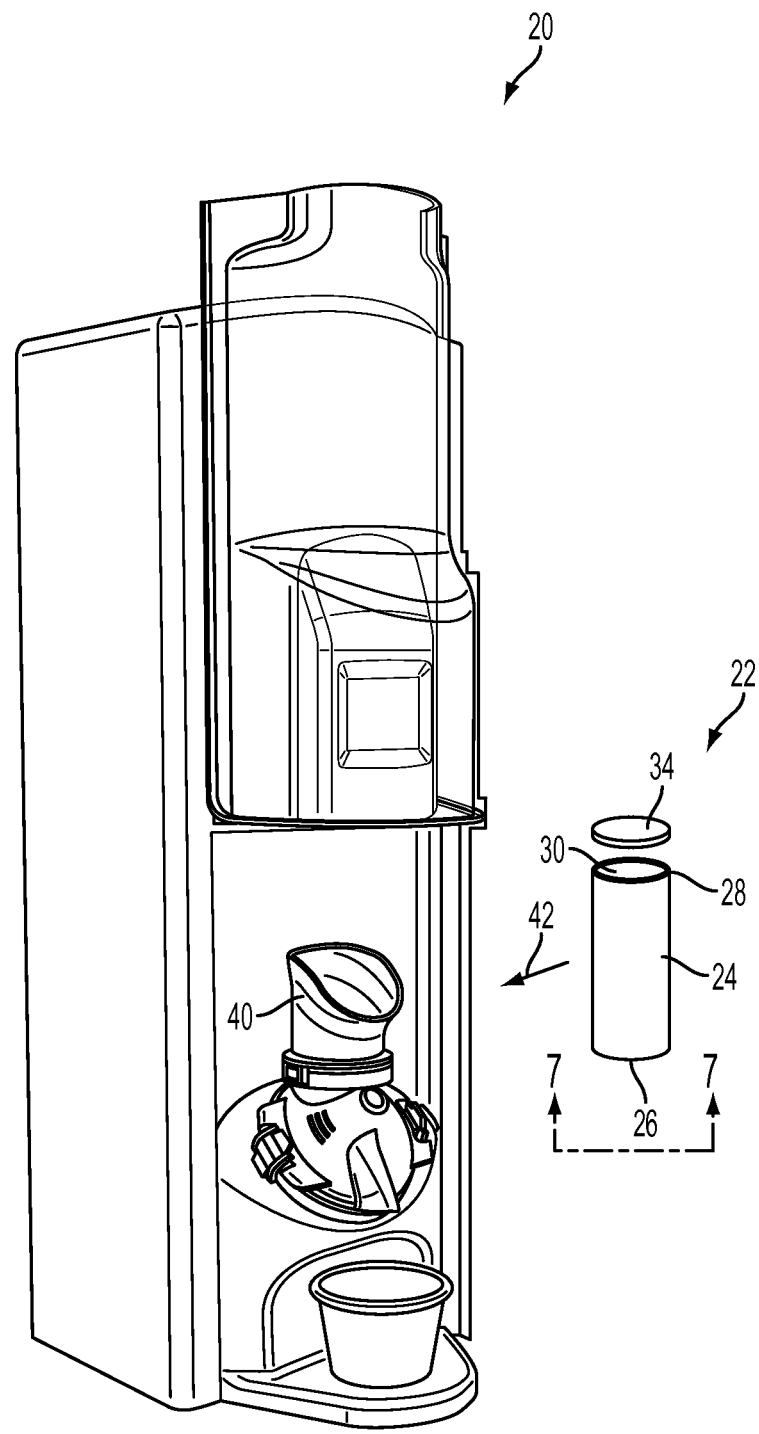
FIG. 1 is perspective view of an example food homogenizer including a cartridge of a supply assembly in accordance within at least one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 illustrates an example food homogenizer 20 that is capable of shredding and homogenizing food. The food homogenizer 20 is capable of blending various types of food product, including frozen fruits, nuts, chocolates, ice cream, ice, etc. However, a particular usefulness is associated with the shredding and homogenizing of frozen fruit.

The blended food product may have a soft puree texture with a similar consistency to ice cream, sherbet, frozen yogurt, or the like. Though it is understood that the term "homogenize" refers to a uniform mixture of elements, as used herein, the term "homogenize" can include a somewhat uniform mixture of elements, and may also encompass non-uniform mixture of elements depending upon the particular food product being used and the degree to which they are shredded/broken down by the food homogenizer 20.

The food homogenizer 20 includes a supply assembly 22 that can assist in supplying the food product to be homogenized. FIG. 1 shows a portion of the supply assembly 22. In an example, the supply assembly 22 includes a cartridge 24. The cartridge 24 defines an elongated structure that extends between a first end 26 and an opposing second end 28. The cartridge 24 defines a hollow interior 30 into which the food product can be received. In one particular example, the food product within the cartridge is frozen fruit. The frozen fruit may be fruit pieces (e.g., banana pieces) or whole fruit (e.g., whole berries). Also, the frozen fruit may be a single fruit type (e.g., only banana pieces) or may be a mixture of fruit types (i.e., banana and berry pieces).

The cartridge 24 includes any number of sizes, shapes, and structures. For example, as illustrated in FIG. 1, the cartridge 24 has a cylindrical shape with a substantially circular cross-section. The cartridge 24 is not limited to this structure, however, and in other examples, may include an oval cross-section, ovoid cross-section, quadrilateral (e.g., square, rectangular, etc.) cross-section, polygonal (e.g., multi-sided) cross-section or the like. Likewise, the cartridge 24 includes any number of dimensions, such as by being longer or shorter than as illustrated, or defining a larger or smaller cross-sectional size than as illustrated.

The supply assembly 22 can include a plunger 34 (schematically shown within FIG. 1). In some examples, the plunger 34 has a cross-sectional shape (e.g., circular, for example) that substantially matches a cross-sectional shape of the interior 30 of the cartridge 24. Likewise, the plunger 34 may have a cross-sectional size that is smaller or slightly smaller than the cross-sectional size of the interior 30, such that the plunger 34 may be received within the cartridge 24. In at least one example, the plunger 34 is supported at the second end 28 within the interior 30 of the cartridge 24. As will be described in more detail below, the plunger 34 can be movably supported with respect to the cartridge 24. It will be appreciated that FIG. 1 illustrates the plunger 34 as being disconnected/disassembled from the cartridge 24 for illustrative purposes. However, in use/operation, the plunger 34 is positioned within the cartridge 24.

The food homogenizer 20 can include a receiving structure 40. The receiving structure 40 defines a substantially hollow chute, channel, trough, or the like that can receive the cartridge 24. For example, the cartridge 24 can be moved in a first direction 42 such that the first end 26 of the cartridge 24 can be inserted into the receiving structure 40.

Figure 2:
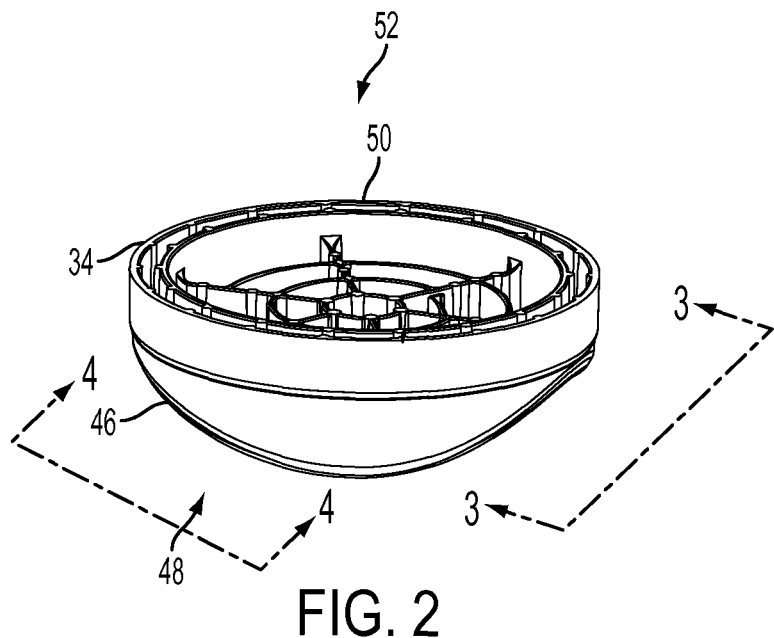
FIG. 2 is an enlarged, perspective view of an example plunger for use in the cartridge of the supply assembly in accordance within at least one aspect of the present invention.
Figure 3:
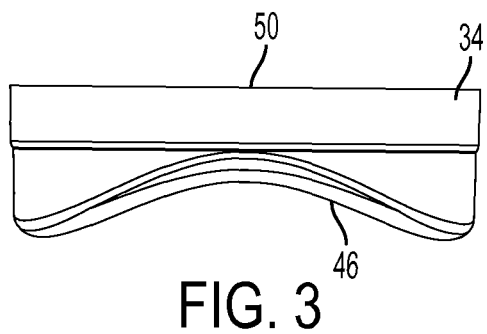
FIG. 3 is a front view of the example plunger along line 3-3 of FIG. 2.
Figure 4:
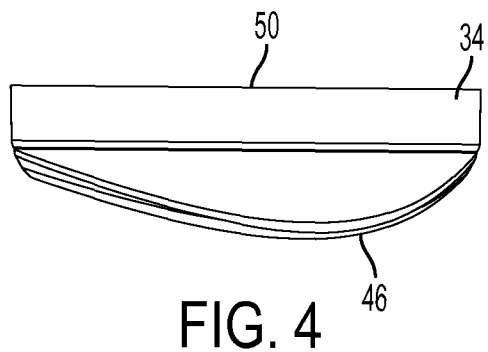
FIG. 4 is a side view of the plunger along line 4-4 of FIG. 2.

Turning to FIGS. 2 to 4, the plunger 34 is illustrated in more detail. The plunger 34 includes a first surface 46 on a first face side 48 of the plunger 34 and a second surface 50 on an opposing second face side 52 of the plunger 34. FIG. 3 illustrates the plunger 34 viewed from a perspective along line 3-3 of FIG. 2. In some examples, the first surface 46 of the plunger 34 is non-parallel with respect to the second surface 50 of the plunger. For example, the first surface 46 may be substantially non-planar. As shown in FIG. 3, the first surface 46 defines a crescent cross-sectional shape, such that the first surface 46 has a rounded, undulating shape. It will be appreciated that the first surface 46 is not limited to this crescent cross-sectional shape, and that in other examples, the degree to which the first surface 46 bends, curves, undulates, etc. may be greater than or less than as illustrated.

FIG. 4 illustrates the plunger 34 viewed from a perspective along line 4-4 of FIG. 2 that is offset about 90° from the illustrated view of FIG. 3. In some examples, the first surface 46 of the plunger 34 is asymmetric. For example, as illustrated and viewed in FIG. 4, a front end of the plunger 34 projects downwardly to a greater degree than a back end of the plunger 34. It will be appreciated, however, that the plunger 34 is not limited to this asymmetrical design, and that in other examples, the plunger 34 may be symmetrical while still having the crescent cross-sectional shape of FIG. 3. The plunger 34 includes any number of materials, including plastics or the like.

Figure 11:
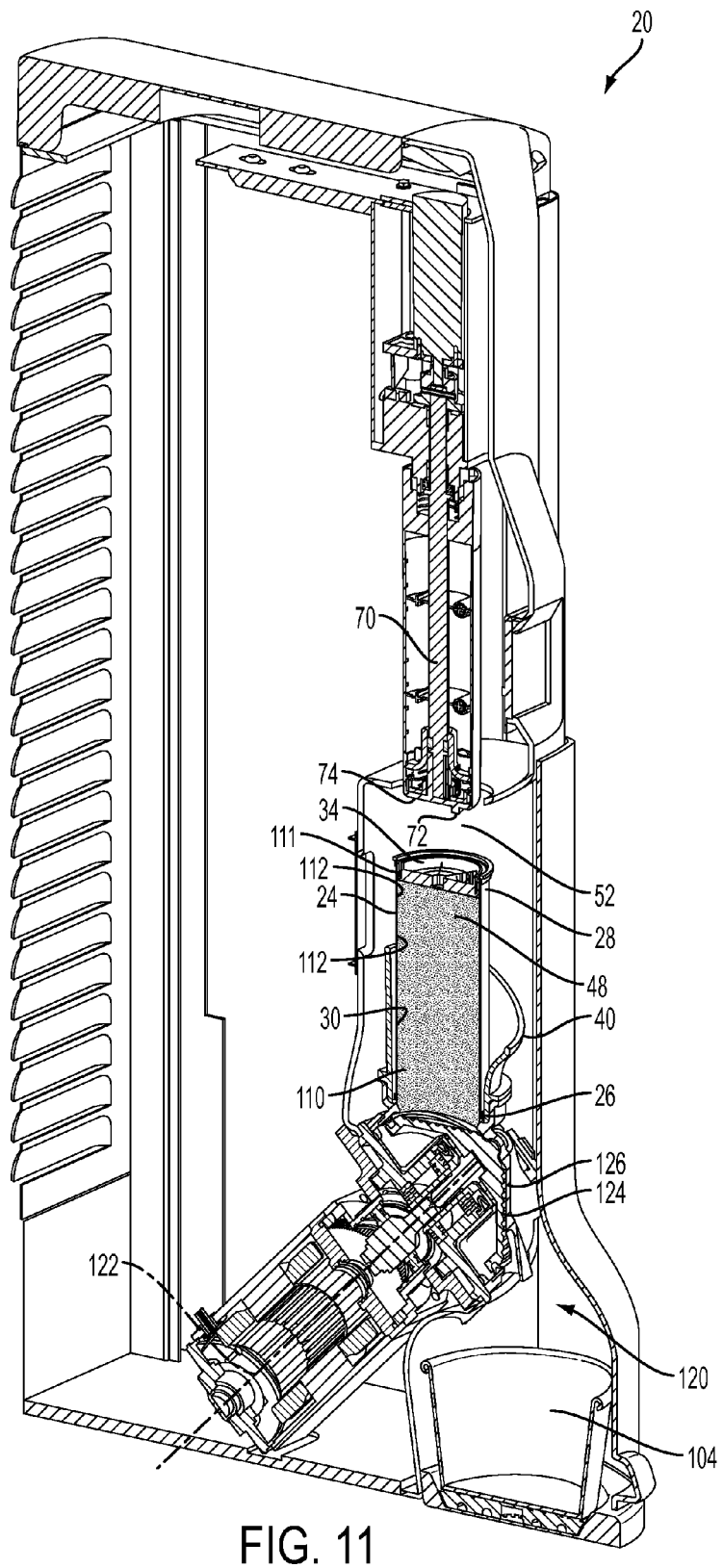
FIG. 11 is a sectional view of the food homogenizer along line 11-11 of FIG. 10, and shows frozen food within the cartridge.

It will be appreciated that the plunger 34 is not limited to the illustrated examples of FIGS. 2 to 4. Rather, the plunger 34 includes any number of sizes, shapes, designs, constructions, etc. In one possible example, the first surface 46 on the first face side 48 of the plunger 34 may be substantially flat, planar, or the like (as illustrated in the example of FIG. 11). In such an example, the substantially flat first surface 46 can contact/push the food product through the cartridge 24. In another example, the second surface 50 on the second face side 52 is not limited to the substantially flat, planar profile, as illustrated. Instead, in other examples, the second surface 50 may be non-planar, such as by including bends, curves, undulations, angles, or the like. It will be appreciated that the plunger 34 includes any combination of shapes for the first surface 46 and the second surface 50. For example, the first surface 46 may be substantially flat, planar or the like (as illustrated in the example of FIG. 11), while the second surface 50 may be either substantially flat or may have bends, curves, undulations, angles, etc. Likewise, the first surface 46 may be curved (as illustrated in the examples of FIGS. 2 to 4), while the second surface 50 may be either substantially flat or may have bends, curves, undulations, angles, etc.

Figure 5:
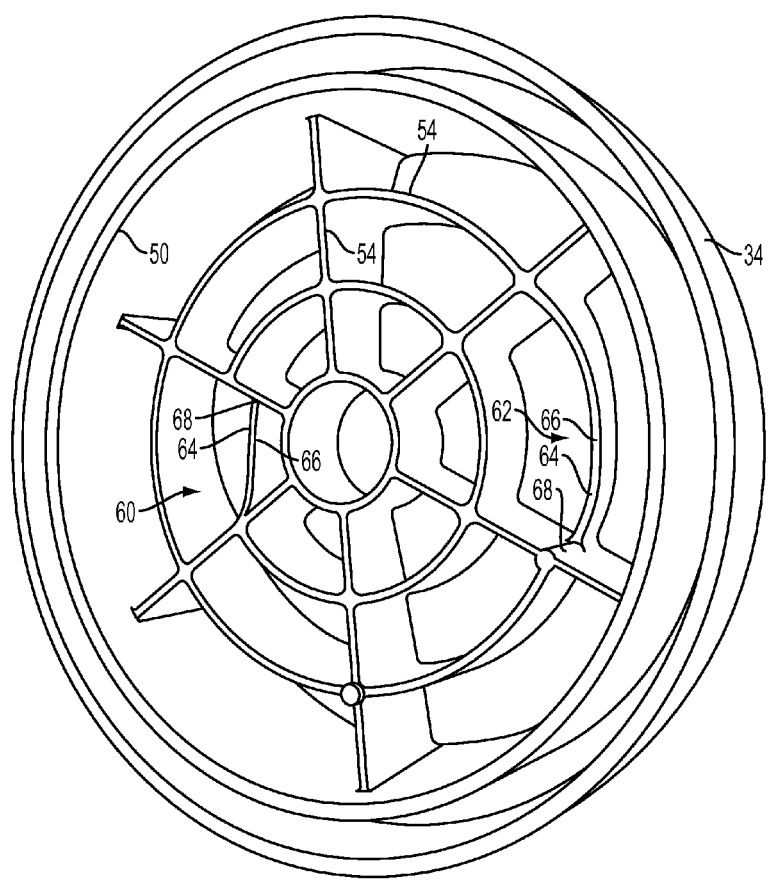
FIG. 5 is a further enlarged view of a second side of the plunger of FIG. 2.

Turning to FIG. 5, the second surface 50 of the plunger 34 is illustrated in more detail. In an example, the second surface 50 of the plunger 34 can include one or more extension portions 54 that define an outcropping, projection, protuberance, or the like. In some examples, the second surface 50 of the plunger 34 includes at least engagement feature, which may include at least one recess. In the illustrated example, the at least one recess includes a first recess 60 and second recess 62. The plunger 34 is not limited to including two recesses, however, and in other examples, may include more than the two illustrated recesses, one recess (e.g., one or more), etc.

The first recess 60 and second recess 62 are formed from extension portions 64 that have a reduced height as compared to surrounding extension portions 54. The first recess and second recess 62 can be substantially identical in size/shape or, in other examples, may have differing sizes/shapes. In at least one example, the first recess 60 and second recess 62 can include a ramp portion 66. The ramp portion 66 defines a sloped angle with respect to the surrounding extension portions 54. The ramp portion 66 is adjacent to a stop portion 68. The stop portion 68 defines a substantially vertically extending wall that abuts the ramp portion 66 defining the first recess 60 and second recess 62. In this example, the stop portion 68 has a larger height than the ramp portion 66.

In some examples, the first recess 60 and second recess 62 are located approximately the same radial distance from a center of the second surface 50. In other examples, however, the first recess 60 and second recess 62 are located at differing distances from the center of the second surface 50. For example, as illustrated in FIG. 5, the first recess 60 is located closer to the center of the second surface 50 than the second recess 62.

Figure 6:
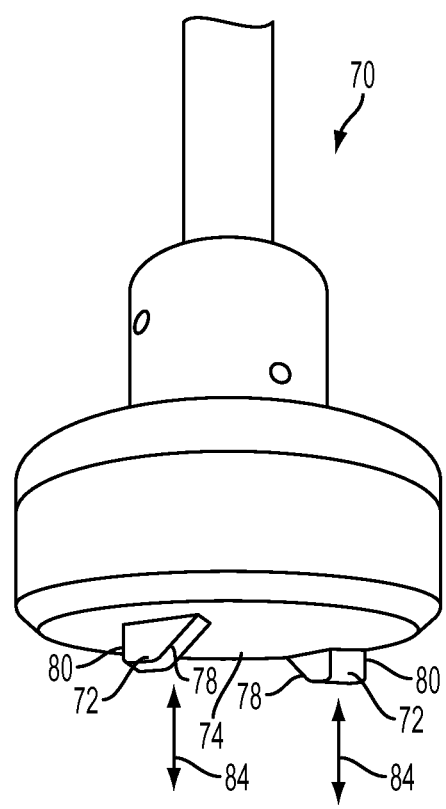
FIG. 6 is a perspective view of an example force application device of the supply assembly in accordance within at least one aspect of the present invention.
Figure 12:
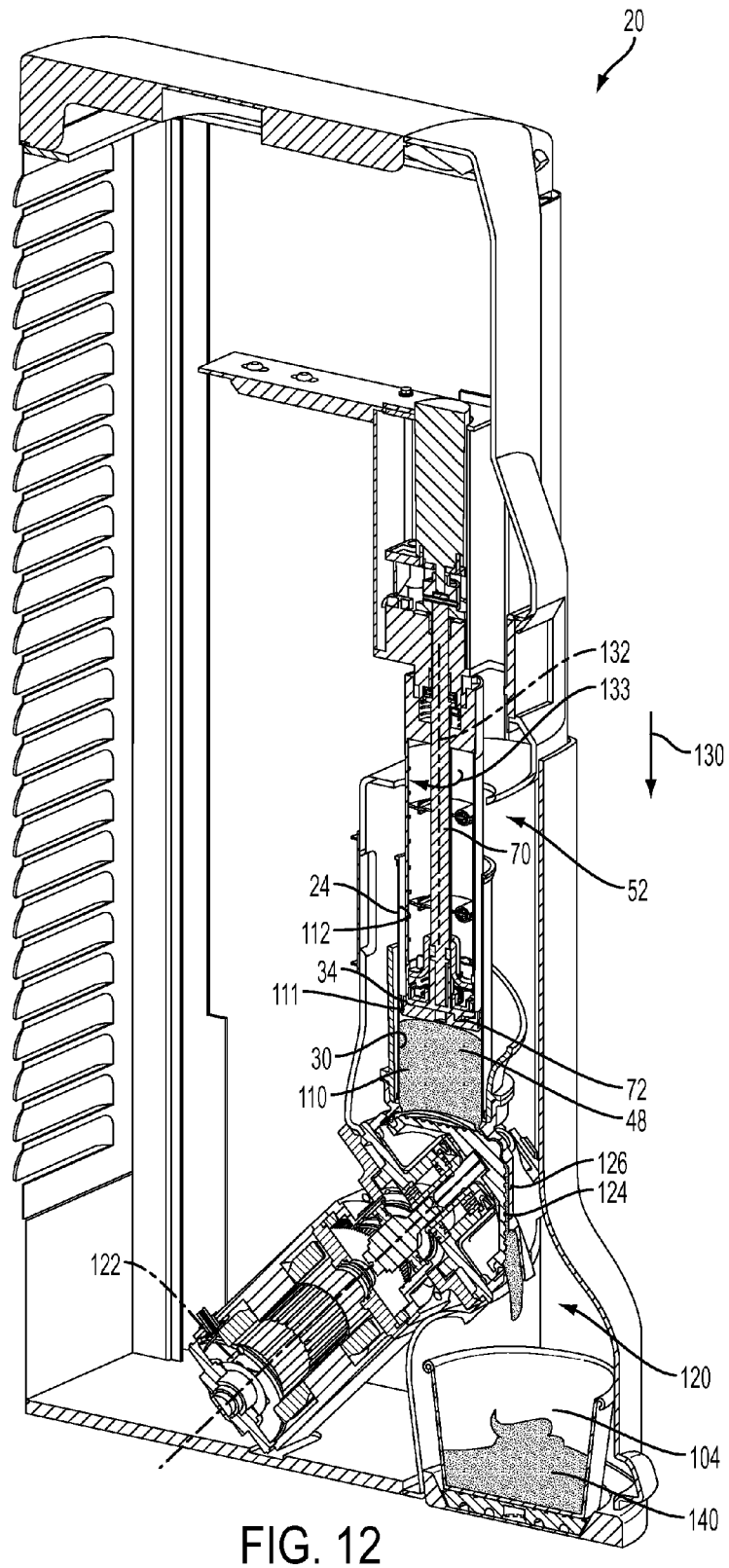
FIG. 12 is a sectional view of the food homogenizer similar to FIG. 11, but with the force application device engaging the plunger and moving the plunger and thus the food within the cartridge against the blade assembly for shredding and homogenizing, and into a serving container.
Figure 13:
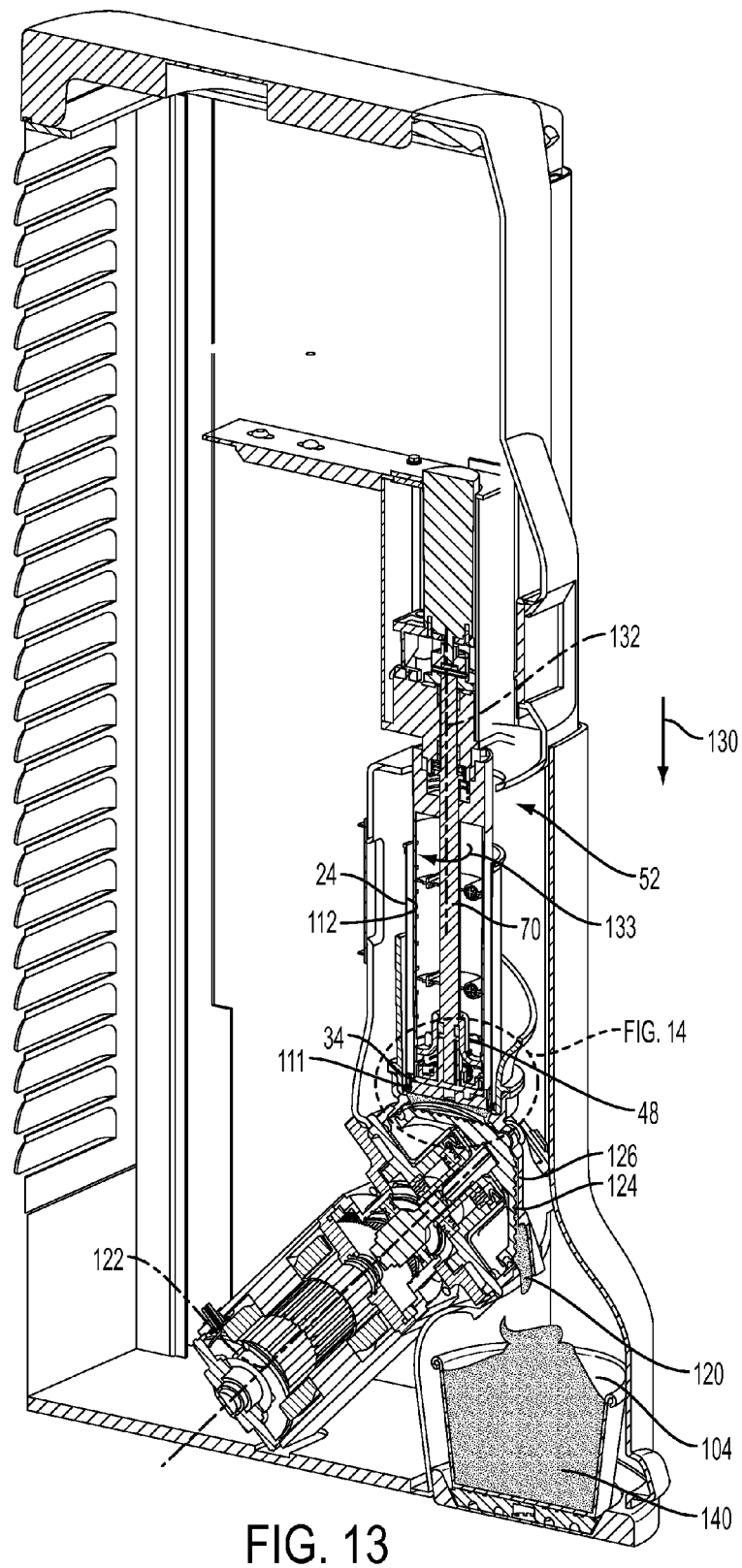
FIG. 13 is a sectional view of the food homogenizer similar to FIG. 11, but with the plunger moved adjacent to a blade assembly and substantially all of the frozen food expelled from the cartridge, against the blade assembly for shredding and homogenizing, and into the serving container.

Turning to FIG. 6, the supply assembly 22 of the food homogenizer 20 includes a force application device 70 (also illustrated in FIGS. 11 to 13). The force application device 70 can apply a downward force to the plunger 34 by engaging the second surface 50. The force application device 70 is located within the food homogenizer 20 and the location therein and the operation to provide the force will be presented and described in further detail following.

Focusing still upon the force application device 70, in some examples, the force application device 70 includes one or more engagement structures 72 extending through a surface 74 of the force application device 70. The engagement structures 72 project downwardly from the force application device 70 in a direction away from the surface 74. While two engagement structures 72 are illustrated, in other examples, any number of engagement structures 72 (e.g., one or more) can be provided. Additionally, the two engagement structures 72 can be substantially identical in size, shape, and structure, or, in other examples, may have different sizes, shapes, structures, etc.

The engagement structures 72 can include an engagement ramp portion 78 and an engagement stop portion 80. In some examples, the engagement ramp portion 78 defines an angled/sloped surface that generally matches a size/shape of the ramp portion 66 of the first recess 60 and second recess 62. The engagement stop portion 80 defines a substantially vertically extending linear surface. In some examples, the engagement stop portion 80 has a height that substantially matches a height of the stop portions 68 of the first recess 60 and second recess 62. In at least one example, the engagement structures 72 substantially match the size and shape of the first recess 60 and second recess 62, such that the engagement structures 72 can be received within the first recess 60 and second recess 62. In particular, the engagement ramp portion 78 can contact and engage the ramp portions 66 while the engagement stop portion 80 can contact and engage the stop portion 68.

The engagement structures 72 can substantially match a radial location of the first recess 60 and the second recess 62. For instance, in the illustrated example, one of the engagement structures 72 can be located closer to a radial center of the surface 74 as compared to the other engagement structure 72. The engagement structures 72 are not limited to such a position, however, and in other examples, in which the first recess 60 and second recess 62 are located equidistant from the radial center of the second surface 50, the engagement structures 72 can likewise be located the same distance away from the radial center of the surface 74.

The engagement structures 72 can be retractable, in some examples. It will be appreciated that the retractability 84 of the engagement structures 72 is illustrated somewhat generically/schematically with arrowheads. In operation, the engagement structures 72 are normally biased to the fully extended position shown in FIG. 6. However, upon engaging portions of the second surface 50 of the plunger 34, the engagement structures 72 can be retracted 84 and withdrawn into the surface 74 of the force application device 70.

Figure 7:
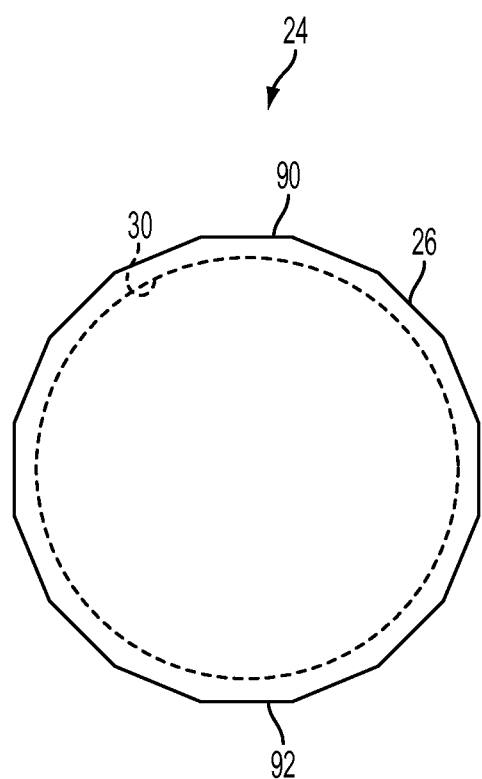
FIG. 7 is an enlarged top down view of one example of the cartridge of FIG. 1 in accordance within at least one aspect of the present invention.

Turning to FIG. 7, an end view of the first end 26 of the cartridge 24 as viewed along line 7-7 of FIG. 1 is shown. In this example, the cartridge 24 can include a lip portion 90 positioned at the first end 26. While not illustrated in FIG. 7, in some examples, the lip portion 90 may also be positioned at the second end 28 of the cartridge 24, such that lip portions 90 are located at both the first end 26 and the second end 28.

The lip portion 90 includes any number of sizes/shapes. In an example, the lip portion 90 includes a polygonal cross-section including a plurality of substantially planar sides 92. In one possible example, the lip portion 90 includes the polygonal cross-sectional including at least three planar sides 92. In the illustrated example, the polygonal cross-section of the lip portion 90 defines a hexadecagon having sixteen sides 92. However, in other examples, the lip portion 90 includes any number of sides 92, such as by including four sides, six sides, eight sides, etc.

The lip portion 90 may temporarily be covered (e.g., an end cap or cover with a removable adhesive, or the like) to limit inadvertent removal/exiting of the food product from within the interior 30 of the cartridge 24. As such, in this example, the position of the interior 30 of the cartridge 24 is illustrated with dashed lines, as the interior 30 may not normally be visible when the first end 26 is covered.

Figure 8:
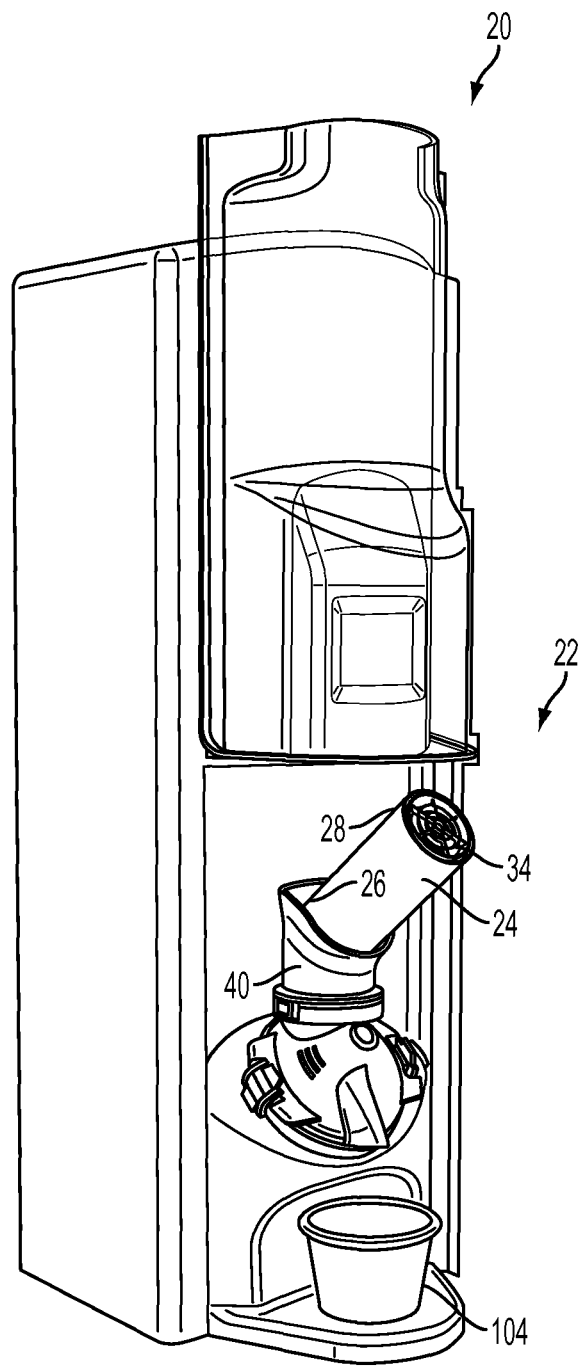
FIG. 8 is a perspective view of the example food homogenizer, similar to FIG. 1, but with the cartridge being inserted into a receiving structure.

Referring to FIG. 8, the first end 26 of the cartridge 24 is inserted into the receiving structure 40. As shown in FIG. 8, the cartridge 24 can be initially tipped during the insertion process. However, upon completion of the insertion process, the cartridge 24 is vertically oriented.

Figure 9:
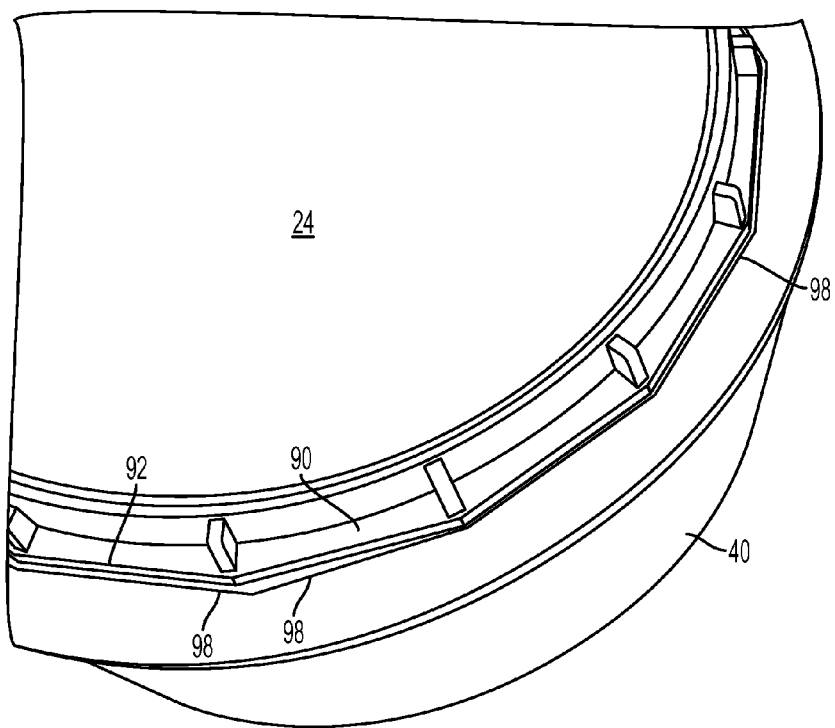
FIG. 9 is an enlarged, perspective view, partially torn away, of the cartridge being inserted into the receiving structure.

Turning to FIG. 9, which is an enlarged partially torn-off view, an example of the lip portion 90 at the first end 26 of the cartridge 24 engaging the receiving structure 40 is illustrated. In some examples, the receiving structure 40 is sized/shaped to receive, in a mating fashion, the lip portion 90. For example, the receiving structure 40 may have a shape that substantially matches the shape of the lip portion 90, while being slightly larger in size than the lip portion 90. In the illustrated examples, the receiving structure 40 includes a polygonal cross-sectional opening defined by a plurality of substantially planar sides 98. In this example, the polygonal cross-section of the receiving structure 40 defines a hexadecagon having sixteen sides 98. However, the receiving structure 40 is not so limited, and, instead, may include any number of sides 98, such as by including four sides, six sides, eight sides, etc.

The receiving structure 40 can receive the first end 26 of the cartridge 24. In particular, the lip portion 90 is inserted into and engages the receiving structure 40 of the food homogenizer. In some examples, the sides 92 of the lip portion 90 engage and/or contact the sides 98 of the receiving structure 40. As such, the polygonal (e.g., hexadecagon) cross-section of the lip portion 90 engages the substantially polygonal (e.g., hexadecagon) cross-section of the receiving structure 40 such that the cartridge 24 is non-rotatable with respect to the receiving structure 40. In particular, due to the sides 92 of the lip portion 90 engaging/contacting the sides 98 of the receiving structure 40, the cartridge 24 is generally limited from rotating with respect to the receiving structure 40.

Referring now to FIGS. 8-13, an example operation of the food homogenizer 20 will now be described. As mentioned concerning FIGS. 8 and 9, the first end 26 of the cartridge 24 is inserted into the receiving structure 40. It will be appreciated that during operation of the food homogenizer 20, the plunger 34 (see briefly FIG. 1) is inserted/moved into/though the interior 30 of the cartridge 24. More particularly, the plunger 34 is movably supported at the second end 28 of the cartridge 24 as a starting point.

Figure 10:
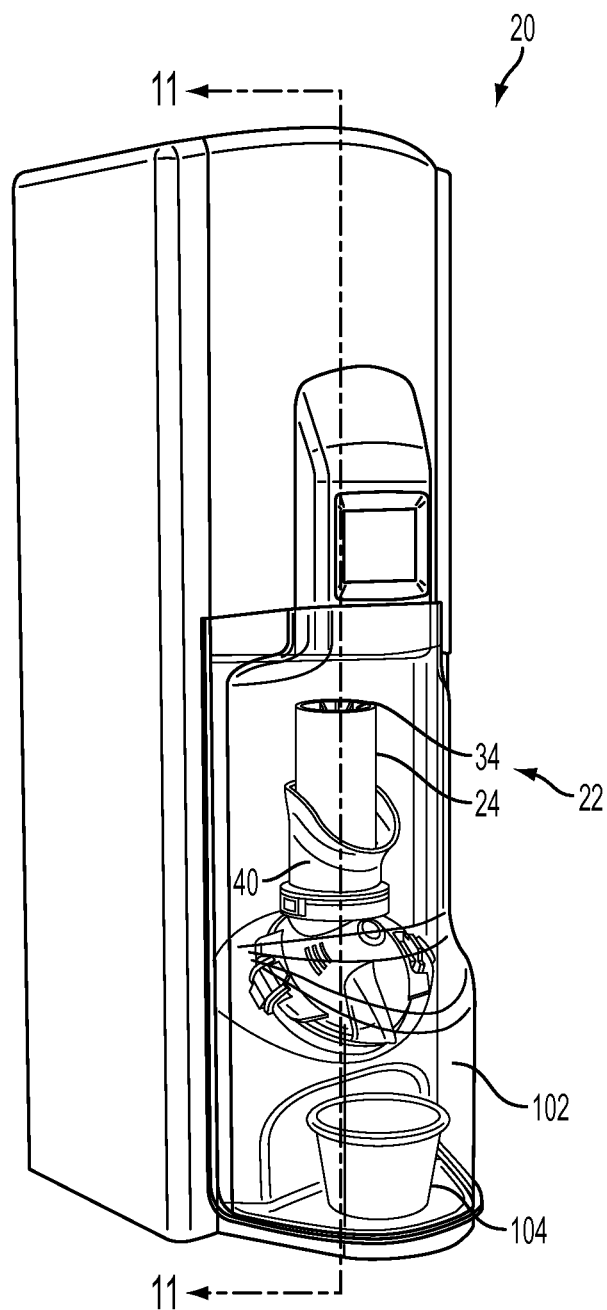
FIG. 10 is a view similar to FIG. 8, but with the cartridge inserted into the receiving structure.

Turning now to FIG. 10, the cartridge 24 is fully inserted into the receiving structure 40 such that the cartridge 24 extends generally vertically. In some examples, a cover 102 can be moved downwardly to cover the supply assembly 22 including the cartridge 24, plunger 34, receiving structure 40, and a container 104, etc.

Turning now to FIG. 11, a sectional view of the food homogenizer 20 along line 11-11 of FIG. 10 is illustrated. It will be appreciated that not all of the internal structures are illustrated in FIG. 11 for ease of illustration. Indeed, in some examples, the food homogenizer 20 may include electronics/circuitry, mechanical structures (pumps, gears, actuators, etc.), or the like.

The food product (shown within FIG. 11 as item 110) is positioned within the interior 30 of the cartridge 24. In the illustrated example, the food product 110 is located on the first side 48 of the plunger 34. As mentioned, the food product 110 includes any number/type of food product, including, but not limited to, frozen fruits, nuts, chocolates, ice cream, ice, etc. However, as mentioned, a particular example food product is frozen fruit, such as banana pieces. The food product 110 can be positioned within the interior 30 from the first end 26 of the cartridge 24 towards the second end 28, with the plunger 34 initially being located at the second end 28. An outer radial edge 111 of the plunger 34 can engage an inner surface 112 of the cartridge 24. In some examples, the first end 26 of the cartridge 24 may initially be covered, so as to limit the food product 110 from exiting through the first end 26. However, the cover may be removed from the first end 26 prior to the cartridge 24 being inserted into the receiving structure 40.

The food homogenizer 20 also includes a blade assembly 120 positioned below the receiving structure 40. The blade assembly 120 is driven by a driving motor for rotational movement about an axis 122. The blade assembly 120 includes a plurality of blades 124 (also illustrated in FIG. 14) arranged radially outward from a surface 126 (also illustrated in FIG. 14) of the blade assembly 120. Though illustrated as only extending along a portion of the blade assembly 120, it is to be understood that the blades 124 may extend completely around the surface 126. In some examples, the blades 124 are oriented generally perpendicularly with respect to the surface 126 of the blade assembly 120. In some examples, the surface 126 of the blade assembly 120 extends substantially conically about the axis 122. As such the blade assembly 120 has a general conic shape.

As can be seen within the section views of FIGS. 11-13, the force application device 70 is located within the food homogenizer 20 at a location above the receiving stricture 40 and the cartridge 24 received within the receiving structure 40. As can be seen within FIG. 11, the force application device 70 has an initial starting position that does not engage the cartridge 24 and the plunger 34 located at the second end 28. Also as can be appreciated via review of the sequence of views 11-13, the force application device 70 is connected to/can include an electrical motors, gears, etc. that are operable to provide movement and thus the applied force. It is to be appreciated that these structures (e.g., motors, gears, etc.) can have various constructions, configurations, etc. and thus need not be specific limitations upon the aspects of the present invention.

Turning now to FIG. 12, the force application device 70 is moved in a downward direction 130 (illustrated generically/schematically with the arrowhead designated 130) towards the plunger 34. Before and/or upon contacting the second surface 50 of the plunger 34, the force application device 70 is rotated 133 about a rotation axis 132. In an example, the surface 74 of the force application device 70 will contact the second surface 50 of the plunger 34 as the force application device 70 is rotated. At some point during the rotation of the force application device 70, the engagement structures 72 will engage and the engagement feature (e.g., recesses 60, 62) of the plunger 34. In particular, the engagement structures 72 engage and are received within the first recess 60 and the second recess 62 of the second surface 50. In particular, the engagement ramp portions 78 of the engagement structure 72 (illustrated in FIG. 6) will contact the ramp portions 66 of the recesses 60, 62 (illustrated in FIG. 5). Likewise, the engagement stop portions 80 of the engagement structure 72 (illustrated in FIG. 6) will contact the stop portions 68 of the recesses 60, 62 (illustrated in FIG. 5).

With this engagement, rotation of the force application device 70 can cause the plunger 34 to rotate with respect to the cartridge 24. Due to the lip portion 90 of the cartridge 24 engaging/contacting the receiving structure 40, the cartridge 24 is generally limited from rotating. As will be described in more detail with respect to FIGS. 13 and 14, the force application device 70 can rotate the plunger 34 such that the first surface 46 of the plunger 34 is oriented with respect to the surface 126 and blades 124 of the blade assembly 120.

As the force application device 70 is moved in the downward direction 130, the force application device 70 can apply a force to the food product 110. In particular, the force application device 70 applies a force on the second side 52 of the plunger 34, causing the plunger 34 to move towards the first end 26 of the cartridge 24. As such, the plunger 34 and the food product 110 are movable with respect to the cartridge 24 towards the blade assembly 120 of the food homogenizer 20. This movement in the downward direction 130 causes the food product 110 to be dispensed from the interior 30 of the cartridge 24 and out of the first end 26.

The food product 110 that is dispensed from the cartridge 24 makes contact with the blade assembly 120. In an example, the blade assembly 120 can rotate about the axis 122 at a sufficiently high rate of speed to cause the food product 110 to be shredded and/or homogenized to form a soft texture with a similar consistency to ice cream or sherbet. The blades 124 of the blade assembly 120 can shred and/or homogenize the food product 110. In some examples, interaction between the food product 110 and the blade assembly 120 forms a homogenized product 140 that exits through an opening in the blade assembly 120. The container 104, positioned below the opening, receives the homogenized product 140.

Turning now to FIG. 13, the force application device 70 continues to move in the downward direction 130 until it is in a fully extended position, as illustrated in FIG. 13. In the fully extended position, a majority of the food product 110 has been shredded and/or homogenized into the homogenized product 140, with a minimal amount of food product 110 remaining between the plunger 34 and the blade assembly 120.

Figure 14:
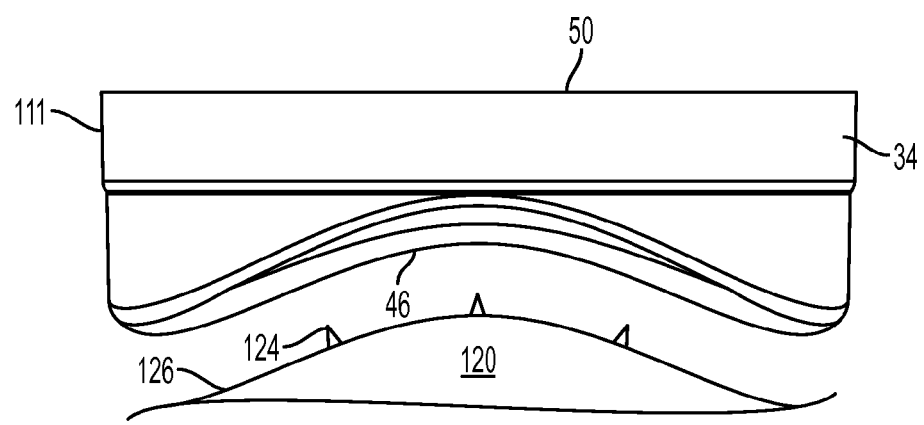
FIG. 14 is an enlarged view, partially torn away, of the encircled area 14 within FIG. 13 and shows detail of the plunger and the blade assembly.

Referring to FIG. 14, an enlarged and partially torn away view of the encircled area 14 within FIG. 13 is shown. In the fully extended position of the force application device 70, the first surface 46 of the plunger 34 is in relatively close proximity to the surface 126 of the blade assembly 120. Due to the rotation of the plunger 34 by the force application device 70 (described above with respect to FIG. 12), the first surface 46 is oriented with respect to the surface 126 in a similar manner as illustrated in FIG. 14. For example, the crescent cross-sectional shape of the first surface 46 substantially matches a shape of the surface 126 of the blade assembly 120. In some respects, the crescent cross-sectional shape of the first surface 46 is a partial conic portion that matches (e.g., in a matting fashion) to the conic shape of the surface 126 of the blade assembly 120. A distance separating the first surface 46 from the surface 126 is larger than a height of the blades 124, so as to minimize the risk of contact between the blades 124 and the plunger 34. As such, in one specific example, a segment of the first surface 46 of the plunger 34 is substantially parallel with respect to a segment of the surface 126 of the blade assembly 120.

The orientation of the plunger 34 with respect to the blade assembly 120 by the force application device 70 provides a number of benefits. For example, by orienting the first surface 46 to be substantially parallel to the surface 126, shredding, grinding, etc. of the plunger 34 by the blades 124 is avoided/prevented. Additionally, the outer radial edges 111 of the plunger 34 are in relatively closer proximity to the blade assembly 120 as compared to a plunger having a substantially planar/flat first surface. This is beneficial because a reduced amount of food product 110 is wasted, since the space between the plunger 34 and the blade assembly 120 is reduced. Indeed, in the illustrated example, a majority of the food product 110 is shredded/homogenized by the blade assembly 120 and deposited into the container 104 as the homogenized product 140.

Figure 15:
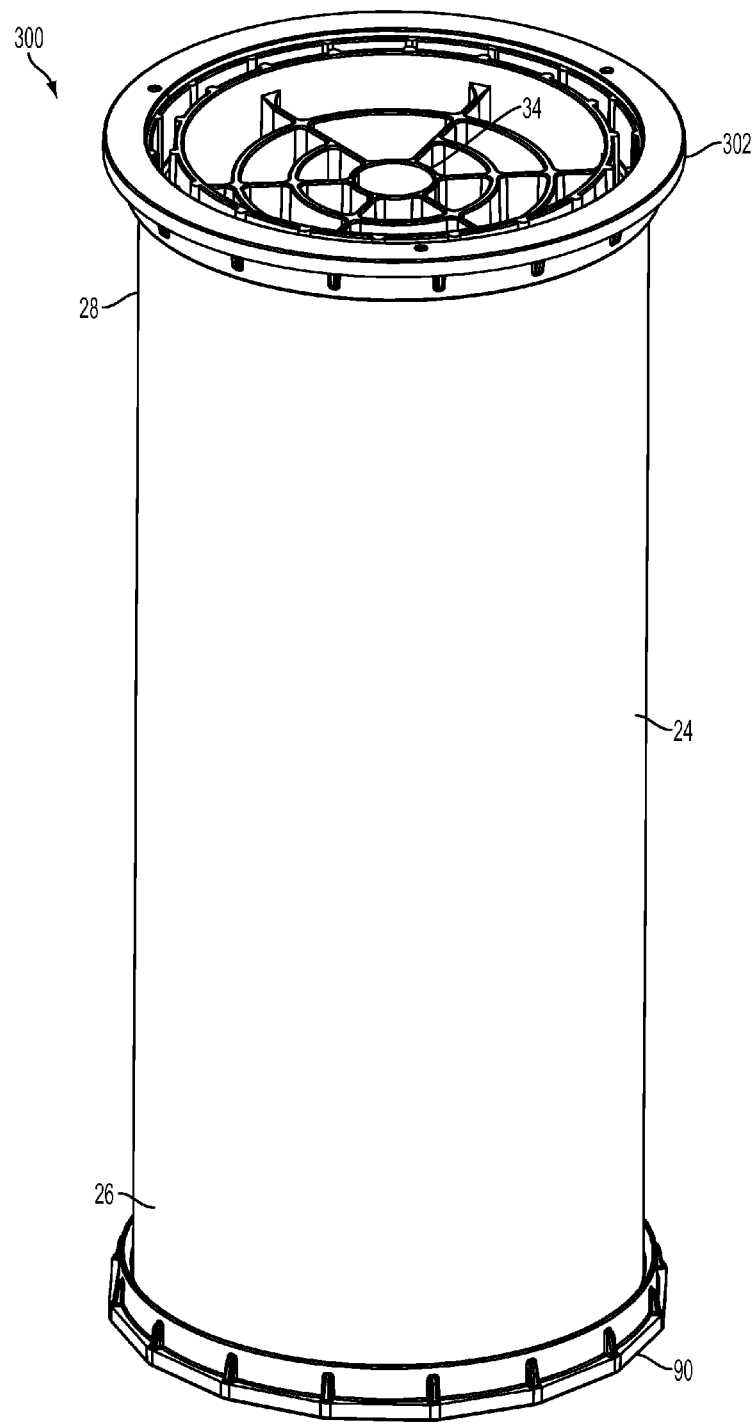
FIG. 15 is an enlarged perspective view of a second example cartridge of the supply assembly.

Turning now to FIG. 15, a second example supply assembly 300 is illustrated. In this example, the second supply assembly 300 can include the cartridge 24 (which extends between the first end 26 and the second end 28), the plunger 34, and the lip portion 90. It will be appreciated that the cartridge 24, plunger 34, and the lip portion 90 are generally identical with respect to the supply assembly 22 described and illustrated above. As such, the descriptions of the cartridge 24, plunger 34, and the lip portion 90 need not be repeated in detail again.

In this example, the second supply assembly 300 can include a second example lip portion 302 disposed at the second end 28 of the cartridge 24 opposite the first end 26. In the illustrated example, the second lip portion 302 includes a substantially circular cross-section such that the second lip portion 302 has a different shape than the lip portion 90 at the first end 26. It will be appreciated that the second lip portion 302 is not limited to the circular cross-section, and that other shapes (e.g., oval, rounded, etc.) are envisioned. By providing the second lip portion 302 with a different shape (e.g., circular in this example) than the lip portion 90, the second lip portion 302 is limited from inadvertently being inserted into the receiving structure 40. That is, during operation, a user is limited to inserting the lip portion 90 into the receiving structure 40 (e.g., due to the substantially matching size/shape) while the second lip portion 302 does not engage/fit within the receiving structure 40.

Figure 16:
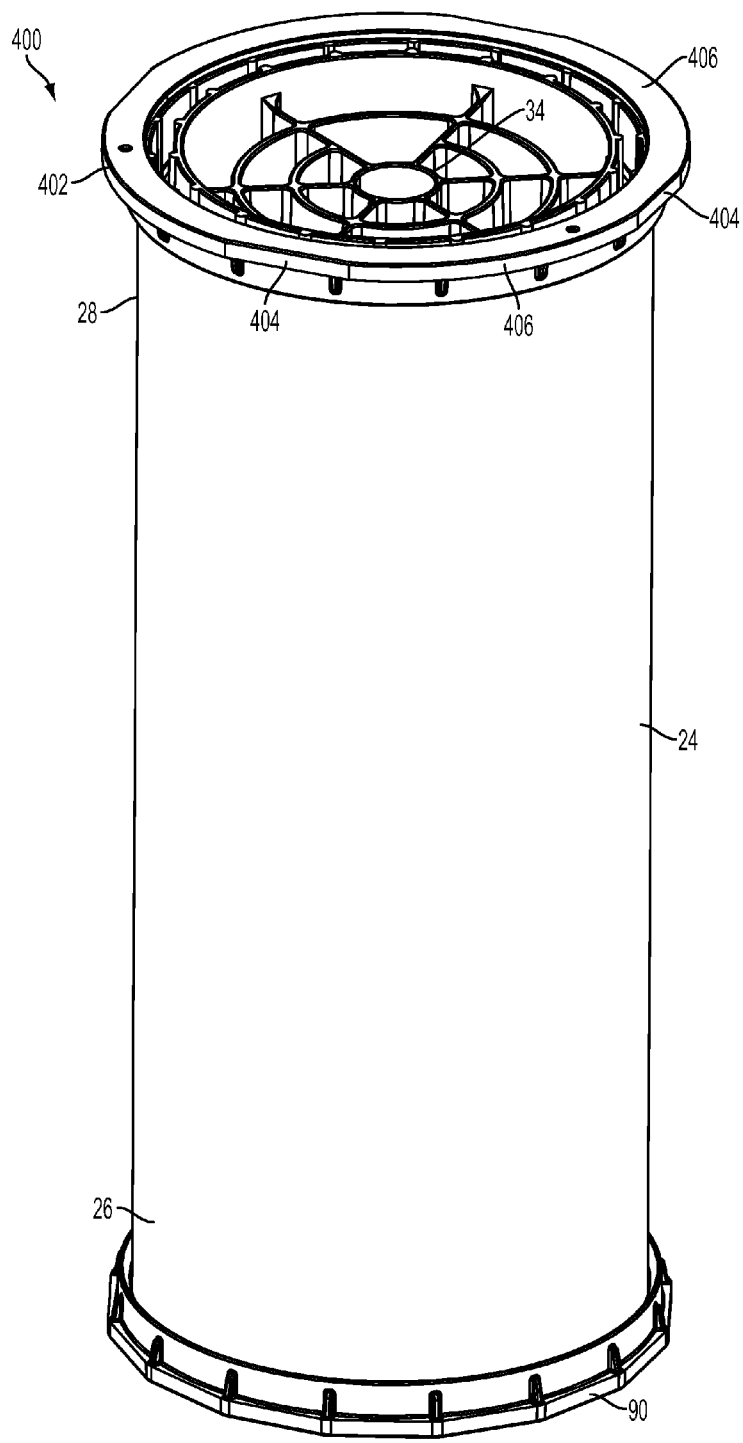
FIG. 16 is an enlarged perspective view of a third example cartridge of the supply assembly.

Turning now to FIG. 16, a third example supply assembly 400 is illustrated. In this example, the third supply assembly 400 can include the cartridge 24 (which extends between the first end 26 and the second end 28), the plunger 34, and the lip portion 90. It will be appreciated that the cartridge 24, plunger 34, and the lip portion 90 are generally identical with respect to the supply assembly 22 described and illustrated above. As such, the descriptions of the cartridge 24, plunger 34, and the lip portion 90 need not be repeated in detail again.

In this example, the third supply assembly 400 can include a third example lip portion 402 disposed at the second end 28 of the cartridge 24 opposite the first end 26. In the illustrated example, the third lip portion 402 includes a multi-sided cross-section with planar sides 404 and non-planar sides 406 such that the third lip portion 402 has a different shape than the lip portion 90 at the first end 26. In this example, the third lip portion 402 includes a total of four planar sides 404 and four non-planar sides 406. The non-planar sides 406 are each disposed between the planar sides 404, with the non-planar sides 406 being substantially rounded. It will be appreciated that the third lip portion 402 is not limited to this shape and/or the number of sides, and in other examples, may include one or more planar sides 404 and one or more non-planar sides 406.

By providing the third lip portion 402 with a different shape (e.g., multi-sided cross-section with planar sides 404 and non-planar sides 406 in this example) than the lip portion 90, the third lip portion 402 is limited from inadvertently being inserted into the receiving structure 40. That is during operation, a user is limited to inserting the lip portion 90 into the receiving structure 40 (e.g., due to the substantially matching size/shape) while the third lip portion 402 does not engage/fit within the receiving structure 40.

It will be appreciated that the supply assemblies 22, 300, 400 are not limited to the illustrated examples herein. Rather, in some possible examples, the cartridge 24 may include tabs, protrusions, extensions, obstructing structures, or various sized lip portions so as to limit inadvertent insertion of the second end 28 of the cartridge 24 into the receiving structure 40. As such, the examples illustrated in FIGS. 15 and 16 are not intended to be limiting, as any number of structures can be used to limit this inadvertent insertion.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A supply assembly of a food homogenizer that has a blade assembly, the supply assembly including:
   a cartridge configured to define an elongate and enclosed hollow interior extending between first and second ends of the cartridge for a frozen food product;
   a plunger located within the cartridge, the plunger being initially positioned within the hollow interior of the cartridge adjacent to the second of the cartridge for retaining the food product within the cartridge and the plunger being movable within the cartridge toward the first end of the cartridge to press upon the food product within the cartridge;
   a receiving structure located adjacent to the blade assembly and defining a hollow chute for receiving the cartridge into the hollow chute and for engaging the first end of the cartridge to retain the cartridge within the hollow chute and spaced above the blade assembly during a forced separation of the food product from the cartridge; and
   a force application device configured to be movable to engage the plunger and transmit a force to the plunger to move the plunger within the hollow interior of the cartridge and press the plunger upon food product to separate the food product from the cartridge, wherein the food product is moved with respect to the cartridge retained by the engagement with the receiving structure and towards the blade assembly of the food homogenizer.

2. The supply assembly of claim 1, wherein the cartridge includes a lip portion at the first end of the cartridge, the lip portion configured to engage a complementary portion of the receiving structure of the food homogenizer.

3. The supply assembly of claim 2, wherein the lip portion defines a polygonal cross-section having a plurality of substantially planar sides that each provide a segment of the lip portion at the first end of the cartridge.

4. The supply assembly of claim 3, wherein the polygonal cross-section of the lip portion includes at least three planar sides.

5. The supply assembly of claim 2, wherein the polygonal cross-section of the lip portion that engages the complementary portion of the receiving structure being further configured to be a substantially matching to a polygonal cross-section of the receiving structure such that the cartridge is non-rotatable with respect to the receiving structure.

6. A supply assembly of a food homogenizer that has a blade assembly, the supply assembly including:
a cartridge configured to define an elongate and enclosed hollow interior extending between first and second ends of the cartridge for a frozen food product;
a plunger movably supported within the hollow interior of the cartridge, the plunger being initially positioned within the hollow interior of the cartridge adjacent to the second of the cartridge for retaining the food product within the cartridge and the plunger being movable within the cartridge toward the first end of the cartridge to press upon the food product within the cartridge, the food product being located on a first side of the plunger;
a receiving structure located adjacent to the blade assembly and defining a hollow chute for receiving the cartridge into the hollow chute and for engaging the first end of the cartridge to retain the cartridge within the hollow chute and spaced above the blade assembly during a forced separation of the food product from the cartridge; and
a force application device configured to be movable to engage the plunger and apply a force on a second side of the plunger to move the plunger within the hollow interior of the cartridge and press the plunger upon food product to separate the food product from the cartridge, wherein the plunger and the food product are movable with respect to the cartridge retained by the engagement with the receiving structure and towards the blade assembly of the food homogenizer.

7. The supply assembly of claim 6, wherein the plunger includes a first surface on the first side of the plunger, the first surface being substantially non-planar.

8. The supply assembly of claim 7, wherein the first surface defines a crescent cross-sectional shape.

9. The supply assembly of claim 8, wherein the crescent cross-sectional shape of the first surface substantially matches a shape of the blade assembly.

10. The supply assembly of claim 7, wherein the plunger includes a second surface on the second side of the plunger, wherein the second surface includes at least engagement feature that is engaged by the force application device.

11. The supply assembly of claim 10, wherein the at least one engagement feature of the plunger includes at least one recess that engages an engagement structure of the force application device.

12. The supply assembly of claim 11, wherein the force application device is configured to rotate the plunger when the engagement structure engages the at least one recess such that the plunger is oriented with respect to the blade assembly.

13. The supply assembly of claim 12, wherein the at least one recess of the plunger includes two recesses and the engagement structure of the force application device includes two engagement structures that are retractable.

14. The supply assembly of claim 12, wherein the plunger includes a first surface on the first side of the plunger, the first surface defining a crescent cross-sectional shape that is asymmetric.

15. The supply assembly of claim 14, wherein the crescent cross-sectional shape of the first surface substantially matches a shape of the blade assembly.

16. The supply assembly of claim 15, wherein when the force application device rotates the plunger such that the plunger is oriented with respect to the blade assembly, the first surface of the plunger is substantially parallel with respect to the blade assembly.

17. A supply assembly of a food homogenizer that has a blade assembly, the supply assembly including:
a cartridge configured to define an elongate and enclosed hollow interior for a frozen food product, the cartridge extending between a first end and an opposing second end;
a plunger movably supported at the second end within the interior of the cartridge, the food product being located on a first side of the plunger such that movement of the plunger towards the first end of the cartridge is configured to dispense the food product from the interior of the cartridge out of the first end toward the blade assembly;
a receiving structure located adjacent to the blade assembly and defining a hollow chute for receiving the cartridge into the hollow chute and for engaging the first end of the cartridge to retain the cartridge within the hollow chute and spaced above the blade assembly during a forced separation of the food product from the cartridge;
a force application device configured to be movable to engage the plunger and transmit a force to the plunger to move the plunger within the hollow interior of the cartridge and press the plunger upon food product to separate the food product from the cartridge, wherein the food product is moved with respect to the cartridge retained by the engagement with the receiving structure and towards the blade assembly of the food homogenizer.

18. The supply assembly of claim 17, wherein the plunger includes a first surface on the first side of the plunger, the first surface being substantially non-planar.

19. The supply assembly of claim 18, wherein the first surface defines a crescent cross-sectional shape.

20. The supply assembly of claim 19, wherein an outer radial edge of the plunger engages an inner surface of the cartridge.

* * * * *